US006673191B2

(12) United States Patent
Harwell et al.

(10) Patent No.: US 6,673,191 B2

(45) Date of Patent: Jan. 6, 2004

(54) METHOD OF AND SYSTEM FOR DISPLAYING CARDS

(75) Inventors: Mark A. Harwell, Plano, TX (US); James D. Hitt, Allen, TX (US); Grant S. Sandground, Addison, TX (US)

(73) Assignee: Beckett Publications, Inc., Dallas, TX (US)

( * ) Notice: Subject to any disclaimer, the term of this patent is extended or adjusted under 35 U.S.C. 154(b) by 272 days.

(21) Appl. No.: 09/731,416

(22) Filed: Dec. 6, 2000

(65) Prior Publication Data

US 2001/0000087 A1 Apr. 5, 2001

Related U.S. Application Data

(62) Division of application No. 09/348,104, filed on Jul. 6, 1999, now Pat. No. 6,295,750.

(51) Int. Cl.[7] ............................ G09F 3/18; B32B 31/00

(52) U.S. Cl. ....................... 156/308.4; 156/312; 40/661

(58) Field of Search ................................ 156/281, 312, 156/308.4; 53/467, 479; 40/661

(56) References Cited

U.S. PATENT DOCUMENTS

| | | | | |
|---|---|---|---|---|
| 2,993,313 A | * | 7/1961 | Hogan | 53/410 |
| 5,177,937 A | * | 1/1993 | Alden | 53/479 |
| 5,362,540 A | * | 11/1994 | Keng | 40/661 |
| 5,522,163 A | * | 6/1996 | Neugebauer | 40/780 |

FOREIGN PATENT DOCUMENTS

| | | | | |
|---|---|---|---|---|
| CA | 810513 | * | 4/1969 | 156/290 |
| FR | 2394391 | * | 2/1979 | |

OTHER PUBLICATIONS

PSA Sports Authenticator Sports Card Display Case advertised in Tuff Stuff Magazine, Published 02/93 at p. 150 in Richmond, VA. U.S.A.

PSA Sports Authenticator Graded Cards advertised in Tuff Stuff Magazine, Published 09/94 at p. 155 vol. 11 No. 5 in Richmond, VA. U.S.A.

ASA Sports Authentication Card Grading System by Alan Hager advertised in Sports Collectors Digest Magazine, Published Mar. 22, 1996 at p. 66 Vol 23 No. 12—805th issue. in Iola, WI. U.S.A.

Certified Sports Authentication Sports Card Authenticators advertised in Sports Collector Digest Magazine, Published Mar. 22, 1996 at p. 105 vol. 23 No. 12—805th issue, in Iola, WI. U.S.A.

Some Thoughts About Card Grading . . . and an Important Announcement by David hall Published in Sports Collectors Digest Magazine Mar. 22, 1996 at p. 106–107 vol. 23 No. 12—805th issue, in Iola, WI. U.S.A.

(List continued on next page.)

*Primary Examiner*—Michael W. Ball

*Assistant Examiner*—Justin Fischer

(74) *Attorney, Agent, or Firm*—Thompson & Knight LLP; Robert C. Hilton

(57) ABSTRACT

A card display system of the present invention includes a transparent first shell part and a transparent second shell part. The first shell part has a perimeter that includes a flange that extends outwardly of the inner surface of the first shell part. The second shell part has a perimeter that is sized to matingly engage the flange of the first shell part. The inner surface of the second shell part includes a card holding depression positioned within the perimeter of the second shell part. A transparent card holding sleeve having substantially the same dimensions as the card holding depression is positionable within the card holding depression. The first and second shell parts are sealed together to encase a card.

4 Claims, 2 Drawing Sheets

OTHER PUBLICATIONS

"Join the PSA Collectors Club!" Advertised in Sports Collectors Digest Magazine, Published Jul. 10, 1998 at p. 27 vol. 25, No. 28, in Iola, WI. U.S.A.

"Your PSA Cards . . . What Are They Really Worth?" advertised in Sports Collectors Digest Magazine Published Jul. 10, 1998 at p. 61 vol. 25, No. 28, in Iola, WI. U.S.A.

CSA Certified Sports Authentication , Inc. Advertised in Sports Collectors Digest Magazine Published Jul. 10, 1998 at p. 131 vol. 28, in Iola, WI. U.S.A.

Certified Sports Authentication, Inc. Card Grading Service Advertised in Sports Collectors Digest Magazine Published May 30, 1997 at p. 158 vol. 24, No. 22, in Iola, WI. U.S.A.

Join the PSA Collector's Club! advertised inSports Collectors Digest Magazine, Published Oct. 24, 1997 at p. 75 vol. 24, No. 43 in Iola, U.S.A. Certified Sports Authentication, Inc. "Join the CSA Diamond Club!" Advertised in Sports Collectors Digest Magazine Published Oct. 24, 1997 at p. 157 vol. 24, No. 43, in Iola, WI. U.S.A.

PSA Sports Authenticator's List of Names and Addresses of their Approved Dealers Advertised in Tuff Stuff Magazine, Published in 11/91 at p. 247 vol. 8, No. 7, in Richmond, VA. U.S.A.

* cited by examiner

METHOD OF AND SYSTEM FOR DISPLAYING CARDS

CROSS-REFERENCE TO RELATED APPLICATIONS

This application is a division of application Ser. No. 09/348,104, filed on Jul. 6, 1999, now U.S. Pat. No. 6,295,750.

FIELD OF THE INVENTION

The present invention relates generally to the field of methods of and systems for displaying and protecting collectable articles, and more particularly to a method of and system for displaying and protecting cards, such as sports cards.

DESCRIPTION OF THE PRIOR ART

Many people collect cards, such as sports cards, for pleasure or for investment. An important aspect of card collecting is the value of the cards. The economic laws of supply and demand are applicable to card collecting just as they are to any other field where a commodity is bought, sold, or traded in a free, unregulated market. Supply, which is the number of cards available on the market, is less than the total number of cards originally produced since attrition diminishes the original quantity. Each year, a percentage of cards is typically thrown away, destroyed, or otherwise lost to collectors. However, this percentage is much much smaller today than it was in the past because more and more people have become increasingly aware of the value of their cards. The demand for cards is influenced by a number of primarily psychological factors such as the popularity of a particular player or team, and the general popularity of card collecting. Also, cards associated with a particular event, such as a superstar's rookie season, are in high demand.

Another factor in determining the value of a card is the card's condition. Other things being equal, the better the condition of a card, the higher its value. Condition grading, however, is subjective. Individual card dealers and collectors differ in the strictness of their grading, but the stated condition of a card should be determined without regard to whether it is being bought or sold. Also, no allowance is given for age. A 1952 card is judged by the same standards as a 1992 card.

The condition of cards is graded based primarily upon centering, corner wear, creases, and assorted miscellaneous defects. Current centering terminology uses numbers representing the percentage of border on either side of the main design. A well centered card has substantially equal borders all the way around the card. Off centered cards range from slightly off center to badly off center. Corner wear is the most scrutinized grading criteria for cards. It is desired that the corners be sharp and completely unworn. One major category of corner wear is a corner with a slight touch of wear, in which the corner is sharp but there is a slight touch of wear showing. A more serious defect is a fuzzy corner, in which the corner still comes to a point, but the point has just begun to fray. Somewhat worse is a slightly rounded corner, in which the fraying of the corner has increased to the point that there is only a hint of a point. Worse still is a rounded corner, in which the point is completely gone. Finally, a badly rounded corner is completely round and rough.

A third common defect is the crease. Creases can be categorized as to severity from light to medium to heavy. A light crease is a crease that is barely noticeable upon close inspection. A medium crease is noticeable when the card is held and steadied at arm's length with the naked eye; however, it does not overly detract from the appearance of the card. A heavy crease is one that has torn or broken through the card's picture surface.

In addition to the major criteria of centering, corner wear, and creases, there are certain miscellaneous flaws that detract from the value of the card. For example, minor flaws such as bubbles or lumps in the surface, gum and wax stains, slanted borders, notching, off center backs, paper wrinkles scratched off cartoons or puzzles on the back of the card, rubberband marks, scratches, surface impressions and warping all tend to lower the card's grade. More serious flaws include chemical or sun fading, erasure marks, mildew, miscutting, holes, tape marks, tears, and stains.

Additionally, alterations decrease the grade of a card. A serious alteration involves deceptive trimming, which occurs when someone alters the card in order to shave off edge wear, improve the sharpness of the corners, or improve centering. In addition to deceptive trimming, persons occasionally attempt to deceptively retouch borders by touching up the edges and corners of cards with a marker of the appropriate color.

Since almost any handling subjects a card to wear, there is a desire to place valuable cards in protective cases or containers. There is also a desire to provide a uniform system of grading or certification. In such a uniform system of certification, a card's condition is certified by a trusted expert grader. However, after a card has been graded, it is necessary that the card be protected from further wear. Additionally, it is necessary that the certification be permanently affixed to the protected graded card so that the grading cannot be altered or applied to another card.

It is an object of the present invention to provide an improved system for displaying graded cards.

SUMMARY OF THE INVENTION

The card display system of the present invention includes a transparent first shell part and a transparent second shell part. The first shell part has inner and outer surfaces and a perimeter. The perimeter of the first shell part will typically be rectangular, but can be configured in any shape. The perimeter of the first shell part includes a flange that extends outwardly of the inner surface of the first shell part. The second shell part also has inner and outer surfaces and a perimeter. The inner surface of the second shell part includes a card holding depression positioned within the perimeter of the second shell part. The card holding depression has dimensions greater than the dimensions of a card to be displayed. The second shell part is smaller than the first shell part such that the flange of the first shell part matingly engages the perimeter of the second shell part to define a card holding chamber between the inner surface of said the first shell part and the card holding depression. The first and second shell parts may be sealed together to encase a card in the card holding chamber.

The system of the present invention also includes a transparent card holding sleeve. Because most collectible cards are rectangular, the card holding sleeve will typically be rectangular, but can be configured in any shape. The card holding sleeve has substantially the same dimensions as the card holding depression to be positionable within the card holding chamber. The sleeve includes a first transparent sheet and a second transparent sheet. The transparent sheets are disposed on opposite sides of the card and at least a portion of the edges of the sheets sealingly engaging each other. Preferably, the edges are sealed at central portions thereof, with the corners being unsealed.

Preferably, the perimeter of the first shell part includes a second flange extending outwardly of the outer surface of the first shell part and the perimeter of the second shell part includes a second flange extending outwardly of the outer surface of the second shell part. The second flanges serve to prevent the outer surfaces of the shell parts from contacting surfaces upon which the system of the present invention is placed, thereby preventing the scratching or marring of the outer surfaces. Also, when several systems are stacked on top of each other, the second flanges engage each other to prevent the systems form sliding with respect to each other.

DESCRIPTION OF THE PREFERRED EMBODIMENT

Figure 1:
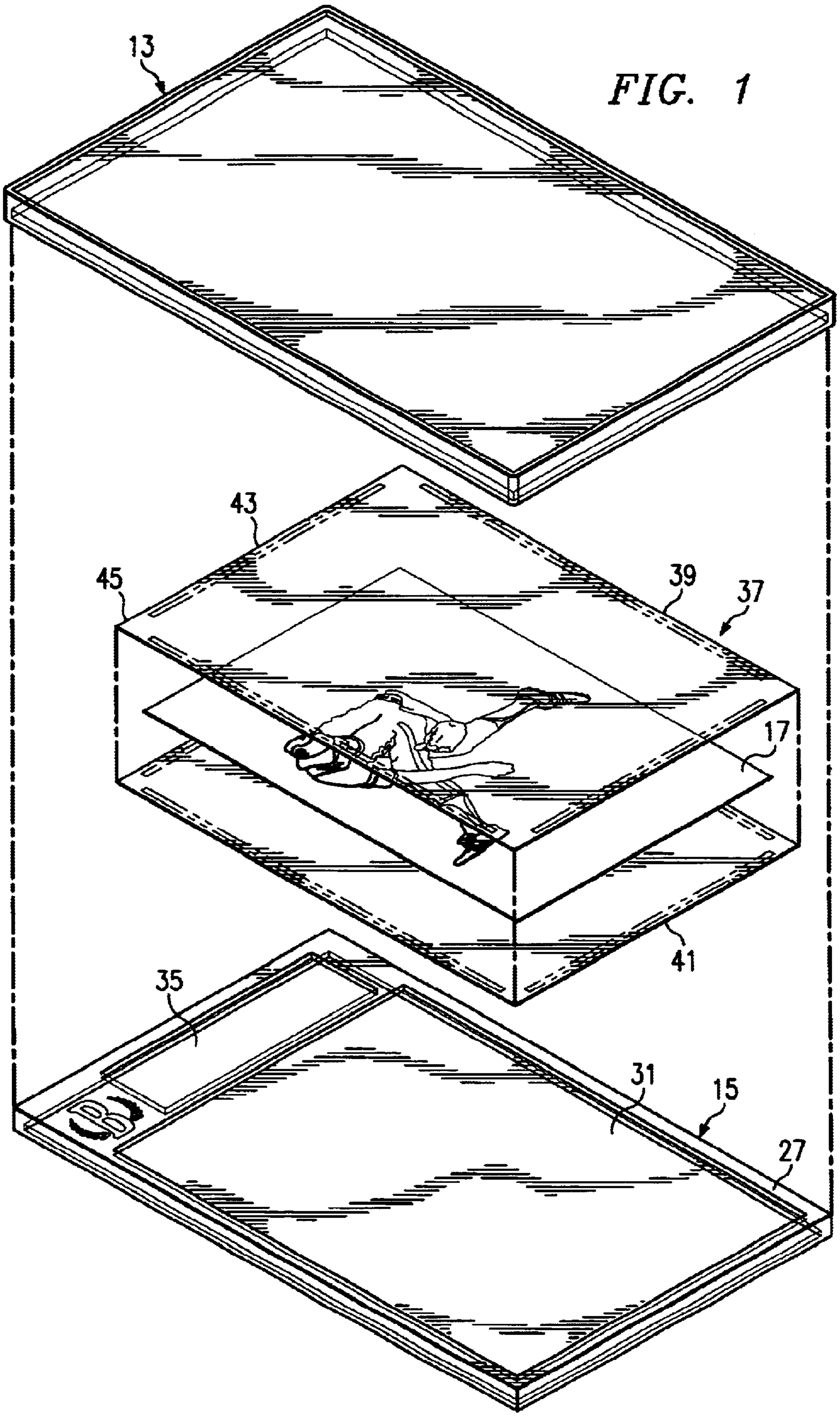
FIG. 1 is an exploded view of the display system of the present invention.

Referring now to the drawings, and first to FIG. 1, the card display system of the present invention includes a first shell part 13 and a second shell part 15, as will be explained in detail hereinafter, shell parts 13 and 15 are sealingly engageable with each other to encase a card 17. (Shell parts 13 and 15 are preferably made of a substantially rigid transparent plastic such as polystyrene.)

Figure 3:
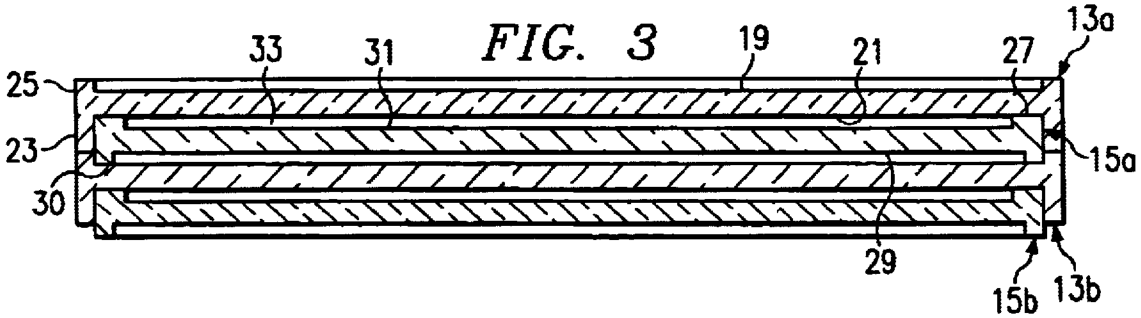
FIG. 3 is a sectional view of two card holding systems stacked according to the present invention.

In the typical embodiment, shell parts 13 and 15 are each rectangular, but shell parts 13 and 15 can be configured in any shape. As best shown in FIG. 3, first shell part 13 includes an outer surface 19 and an inner surface 21. The perimeter of first shell part 13 includes a first flange 23 that extends outwardly of inner surface 21. Preferably, the perimeter of first shell 13 also includes a second flange 25 that extends outwardly of outer surface 19.

Referring still to FIG. 3, second shell part 15 includes an inner surface 27 and an outer surface 29. The perimeter of second shell part 15 is sized to matingly engage with flange 23 of first shell part 13. The perimeter of second shell part 15 includes a flange 30 that extends outwardly of outer surface 29.

As best shown in FIG. 1, inner surface 27 of second shell part 15 includes a card holding depression 31 positioned within the perimeter of second shell part 15. Because most collectible cards are rectangular, the card holding depression 31 will typically be rectangular, but can be configured in any shape. As shown in FIG. 3, when shell parts 13 and 15 are engaged with each other, card holding depression 31 cooperates with inner surface 21 of first shell part 13 to form a card holding chamber 33. As best shown in FIG. 1, inner surface 27 of second shell part 15 also includes a grade card holding depression 35, which is adapted to hold a grading card, as will be described in detail hereinafter.

Referring again to FIG. 1, the system of the present invention includes a card holding sleeve, designated generally by the numeral 37, which has substantially the same dimensions are card holding depression 31. The dimensions of card holding sleeve 37 are larger than those of card 17. Card holding sleeve 37 includes a first transparent sheet 39 and a second transparent sheet 41. Sheets 39 and 41 are preferably sheets of acid-free polypropylene with a UV protectant. Sheets 39 and 41 are adapted to be sealed around card 17. Of course, one of ordinary skill in the art will appreciate that sheets 39 and 41 may be formed by folding a single transparent sheet around card 17. (In the preferred embodiment, sheets 39 and 41 are sealed along the central portions 43 of each of their edges, leaving the corners 45 unsealed.) (Corners 45 are left unsealed so) (as to make the conditions of the corners of card 17 clearly visible and avoid the possibility of altering the condition of the corners.) Card holding sleeve 37 prevents card 17 from being damaged by movement within card holding chamber 33.

Figure 2:
FIG. 2 is a front view of the display system of the present invention.
Figure 4:
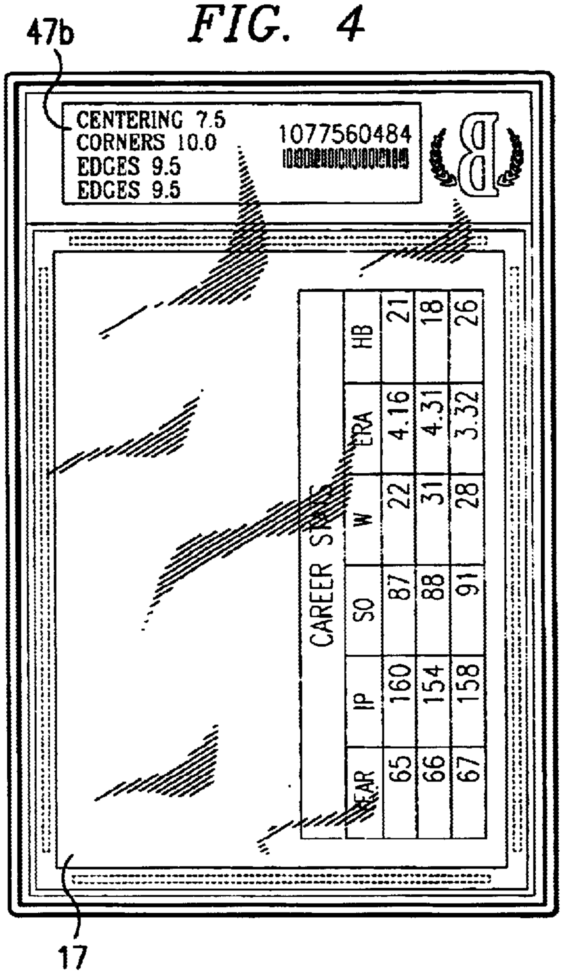
FIG. 4 is a back view of the display system of the present invention.

In operation, a card collector delivers a card 17 he wishes to have graded to a trusted card grading or certification service. An expert grader applies established criteria to determine an overall grade for the card. The certification service prepares a grade card, designated by the numeral 47 in FIGS. 2 and 4. In the preferred embodiment, the front side 47*a* of the grade card includes a numerical overall grade for the card and a descriptive condition. Referring to FIG. 2, card 17 has been awarded a numerical grade of 8.5 and a descriptive condition of near mint—mint, which indicates a card having only one minor flaw. The reverse side 47*b* of the grading card preferably includes detailed grades for centering, corners, and the like, as well as a certification number. Grading cards 47 may be color-coded according to the overall grade of the card. For example, cards graded 10 would have a gold grading card, cards graded 8 to 9.5 would have a silver grading card, and cards graded 7.5 or lower would have a white grading card.

After card 17 has been graded, the card may then be placed between transparent sheets 39 and 41. The central portions 43 of the edges of sheets 39 and 41 are sonically sealed to form card holding sleeve 37 about card 17. Typically, in the embodiment where sheets 39 and 41 are rectangular in shape, the central portions 43 of up to three edges of sheets 39 and 41 may be sonically sealed together to form an envelope or slip cover prior to placing card 17 between sheets 39 and 41. Thereafter, the central portion 43 of the remaining edge or edges of sheets 39 and 41 may be sealed together. Alternatively, card 17 may be placed between sheets 39 and 41 before any of the central portions 43 of the edges of sheets 39 and 41 are sealed.

After card 17 has been sealed within card holding sleeve 37, sleeve 37 is placed into card holding depression 31 of second shell part 15 and grade card 47 is placed into grade card holding depression 35. Then, first shell part 13 is placed over second shell part 15 with its first flange 23 engaging the perimeter of second shell part 15. Then, shell parts 13 and 15 may be sonically welded together to permanently encase card 17 and grade card 47.

As shown in FIG. 3, second flange 25 of first shell part 13 and flange 30 of second shell part 15 serve to protect the outer surfaces 19 and 29 of shell parts 13 and 15, respectively. Flanges 25 and 30 serve as stand offs to prevent contact of surfaces 19 and 29 with other surfaces, thereby preventing scratching or marring of the surfaces. Additionally, as shown in FIG. 3, when multiple systems of the present invention are stacked, flange 25 of second shell part 15 engages flange 25 of an adjacent system to keep the systems from sliding with respect to each other.

From the foregoing, it will be recognized that the system of the present invention provides a superior system for protecting and displaying graded cards. The combination of the card holding sleeve and the rigid transparent shell parts prevents the card from being damaged after it has been encased. The present invention has been illustrated and described with reference to a presently preferred embodiment. Those skilled in the art will recognize alternative shapes and sizes of parts may be utilized. Accordingly, the true spirit and scope of the invention shall be determined with reference to the claims.

What is claimed is:

1. A method of protecting a card comprising the steps of:

sealing at least a portion of at least one edge of a first transparent sheet to at least one edge of a second transparent sheet while leaving unsealed at least one edge of said first and second transparent sheet;

placing said card between said first and second transparent sheets, said card having dimensions such that each edge of said first and second transparent sheets extends outwardly of said card;

sealing at least a portion of each said unsealed edge of said first and second transparent sheets about said card;

placing said sealed transparent sheets between a first transparent shell part and a second transparent shell part, the second shell part having a card holding depression;

wherein the card holding depression receives the card and the first and second transparent sheets; and wherein said edges of said first and second transparent sheets each includes a central portion and end portions, said end portions of adjacent edges defining corners, and said step of sealing at least a portion of said edges of said first and second transparent sheets includes the step of sealing said central portions while leaving unsealed said end portions.

2. The method of claim 1 further comprising the step of:

sealing said first and second shell parts about said sealed transparent sheets.

3. A method of protecting a card comprising the steps of:

placing said card between a first transparent sheet and a second transparent sheet, each of said first and second transparent sheets including edges extending outwardly of said card;

sealing at least a portion of said edges of said first and second transparent sheets about said card;

placing said sealed transparent sheets between a first transparent shell part and a second transparent shell part, the second shell part having a card holding depression;

wherein the card holding depression receives the card and the first and second transparent sheets; and wherein said edges of said first and second transparent sheets each include a central portion and end portions, said end portions of adjacent edges defining corners, and said step of sealing at least a portion of said edges of said first and second transparent sheets includes the step of sealing said central portions while leaving unsealed said end portions.

4. The method as claimed in claim 3 further comprising the step of sealing said first and second shell parts about said sealed transparent sheets.

* * * * *